United States Patent
Zhang et al.

(10) Patent No.: US 7,853,809 B2
(45) Date of Patent: Dec. 14, 2010

(54) SYSTEM AND METHOD OF POWER MANAGEMENT

(75) Inventors: Fumin Zhang, Eden Prairie, MN (US); Angel Matson, Minnetonka, MN (US); David Scott Seekins, Shakopee, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 850 days.

(21) Appl. No.: 11/652,291

(22) Filed: Jan. 11, 2007

(65) Prior Publication Data

US 2008/0172567 A1 Jul. 17, 2008

(51) Int. Cl.
*G06F 1/00* (2006.01)

(52) U.S. Cl. .................. 713/300; 713/310; 713/320; 713/321; 713/322; 713/323; 713/324; 713/330; 713/340

(58) Field of Classification Search ............ 713/300, 713/310, 320–324, 330, 340
See application file for complete search history.

(56) References Cited

U.S. PATENT DOCUMENTS

| | | | |
|---|---|---|---|
| 4,933,785 A | 6/1990 | Morehouse et al. | |
| 5,231,549 A | 7/1993 | Morehouse et al. | |
| 5,345,347 A | 9/1994 | Hopkins et al. | |
| 5,521,768 A | 5/1996 | Shrinkle et al. | |
| 5,544,138 A | 8/1996 | Bajorek et al. | |
| 5,673,242 A | 9/1997 | Lin | |
| 5,774,292 A | 6/1998 | Georgiou et al. | |
| 5,787,292 A | 7/1998 | Ottesen et al. | |
| 5,791,880 A | 8/1998 | Wilson | |
| 5,854,720 A | 12/1998 | Shrinkle et al. | |
| 5,872,669 A | 2/1999 | Morehouse et al. | |
| 6,134,069 A | 10/2000 | Catalano et al. | |
| 6,353,894 B1 | 3/2002 | Pione | |
| 6,512,652 B1 | 1/2003 | Nelson et al. | |
| 6,608,729 B1 | 8/2003 | Willems et al. | |
| 6,622,252 B1 | 9/2003 | Klaassen et al. | |
| 6,892,313 B1 | 5/2005 | Codilian et al. | |
| 7,068,456 B2 | 6/2006 | Walz | |
| 7,120,806 B1 | 10/2006 | Codilian et al. | |
| 7,162,279 B2 * | 1/2007 | Gupta | 455/574 |
| 7,353,413 B2 * | 4/2008 | Dunstan | 713/320 |
| 2002/0004915 A1 | 1/2002 | Fung | |
| 2003/0156345 A1 | 8/2003 | Fayeulle et al. | |
| 2003/0165090 A1 | 9/2003 | Turner et al. | |
| 2003/0200473 A1 | 10/2003 | Fung | |
| 2004/0107273 A1 * | 6/2004 | Biran et al. | 709/223 |
| 2005/0044241 A1 * | 2/2005 | Dunstan | 709/228 |
| 2005/0144491 A1 | 6/2005 | Zayas | |
| 2005/0174678 A1 | 8/2005 | Zayas et al. | |
| 2005/0184773 A1 | 8/2005 | Boyko et al. | |
| 2007/0060057 A1 * | 3/2007 | Matsuo et al. | 455/63.1 |
| 2007/0245163 A1 * | 10/2007 | Lu et al. | 713/300 |

\* cited by examiner

*Primary Examiner*—Abdelmoniem Elamin
(74) *Attorney, Agent, or Firm*—Theodore M. Magee; Westman, Champlin & Kelly, P.A.

(57) ABSTRACT

The present disclosure is directed to systems and methods of power management of a device. In a particular embodiment, the method includes determining a first power consumption value for a first power management operating sequence of an electronic device. The method also includes determining a second power consumption value for a second power management operating sequence based on previous activity of the electronic device. The method also includes selecting either the first power management operating sequence or the second power management operating sequence.

25 Claims, 6 Drawing Sheets

SYSTEM AND METHOD OF POWER MANAGEMENT

FIELD OF THE DISCLOSURE

The present disclosure relates generally to power management of an electronic device and more specifically to power management of a data storage device.

BACKGROUND

Motors and electronics consume energy when in operation. Motors and electronics in portable devices, such as in a data storage device of a portable computer or music player, can operate on battery power. Accordingly, a motor and electronics operating on battery power can consume a certain amount of power before its battery must be recharged or replaced. Thus, there is a need for a system and method of power management to decrease the amount of power used.

DETAILED DESCRIPTION OF THE DRAWINGS

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present invention.

The present disclosure is directed to a device including an electronic circuit operable at a nominal power level and a first power management operating sequence for reducing power usage of the electronic circuit below the nominal power level. The device also includes a second power management operating sequence for reducing power usage of the electronic circuit below the nominal power level, where the second power management operating sequence is different than the first power management operating sequence. The device also includes a controller operable to select either the first power management operating sequence or the second power management operating sequence at least based on an amount of time the device has spent in a phase of operation.

In another embodiment, the disclosure is directed to a method including determining a first power consumption value for a first power management operating sequence of an electronic device. The method also includes determining a second power consumption value for a second power management operating sequence, where at least the second power consumption value is based on previous activity of the electronic device. The method also includes selecting either the first power management operating sequence or the second power management operating sequence based on the first power consumption value and the second power consumption value.

In another embodiment, the disclosure is directed to a computer-readable medium having instructions for causing a processor to execute a method including determining a first power consumption value for a first power management operating sequence of an electronic device, determining a second power consumption value for a second power management operating sequence of the electronic device based on an amount of time the electronic device has spent in a phase of operation, and selecting either the first power management operating sequence or the second power management operating sequence based on the first power consumption value and the second power consumption value.

In yet another embodiment, the present disclosure is directed to a device including an electronic circuit operable at a nominal power level and a first power management operating sequence for reducing power usage of the electronic circuit below the nominal power level. The device also includes a second power management operating sequence for reducing power usage of the electronic circuit below the nominal power level, where the second power management operating sequence is different than the first power management operating sequence. The device includes a controller coupled to the electronic circuit and operable to receive an instruction from a host to enter either the first power management operating sequence or the second power management operating sequence. The first power management operating sequence comprises at least a first power savings mode and a first operating mode and the second power management operating sequence comprises at least a second power savings mode, a power up mode, and a second operating mode. In addition, the first power savings mode is different than the second power savings mode.

Figure 1:
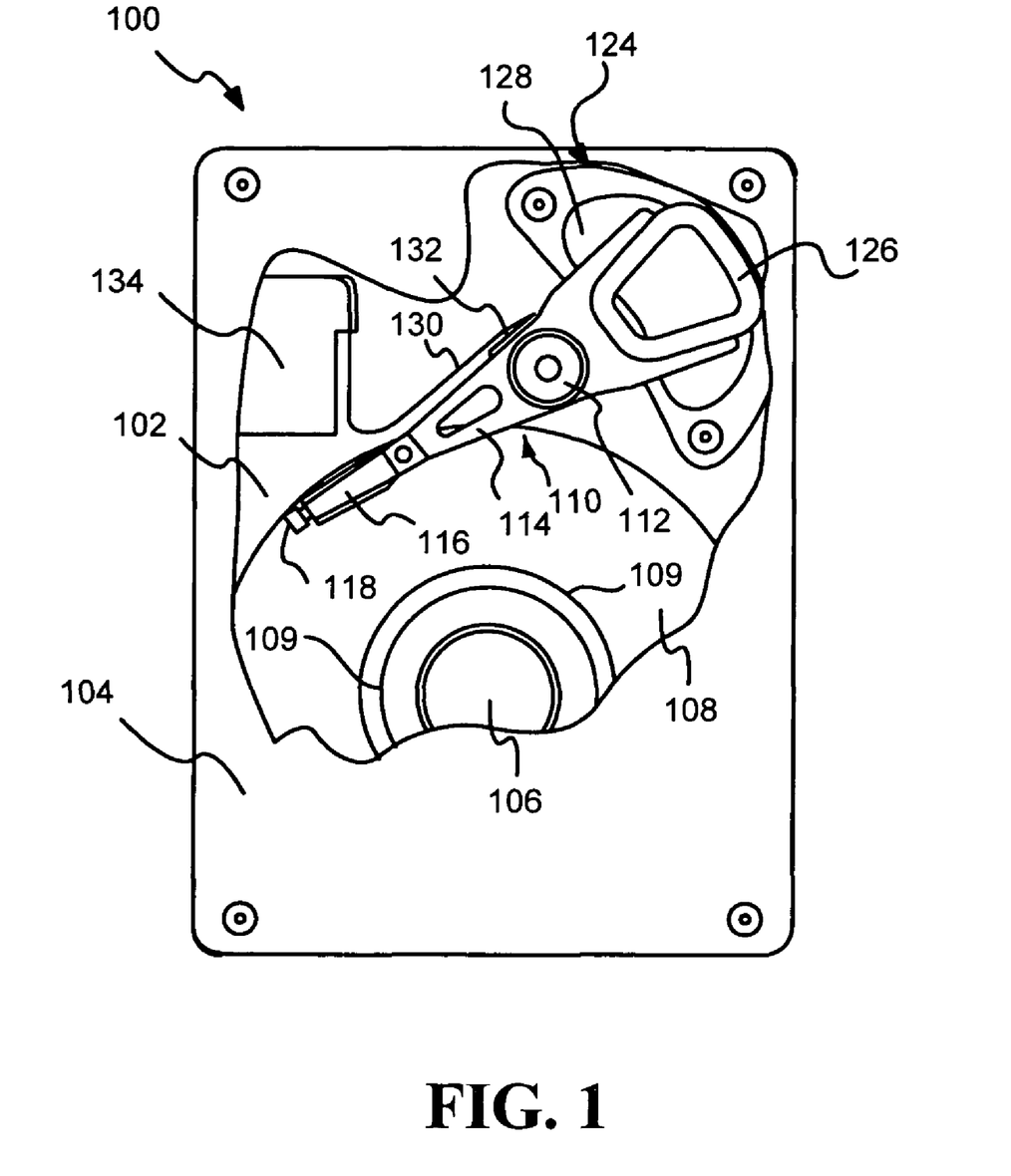
FIG. 1 is a cutaway view of an illustrative embodiment of a disc drive.

Referring to FIG. 1, in a particular embodiment, a disc drive 100 includes a base 102 to which various components of the disc drive 100 are mounted. A top cover 104, shown partially cut away, cooperates with the base 102 to form an internal, sealed environment for the disc drive. The components of the disc drive 100 include a spindle motor 106, which rotates one or more discs 108. Information is written to and read from tracks on the discs 108 through the use of an actuator assembly 110 that rotate about a bearing shaft assembly 112 positioned adjacent the discs 108. The actuator assembly 110 includes one or more actuator arms 114 that extend toward the discs 108, with one or more flexures 116 extending from the actuator arms 114. Mounted at the distal end of each of the flexures 116 is a head 118 including an air bearing slider (not shown) that enables the head 118 to fly in close proximity above the corresponding surface of the associated disc 108.

The track position of the heads 118 is controlled, during a seek operation, through the use of a voice coil motor (VCM) 124 that typically includes a coil 126 attached to the actuator assembly 110, as well as one or more permanent magnets 128 that establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

A flex assembly 130 provides requisite electrical connection paths for the actuator assembly 110 while allowing pivotal movement of the actuator assembly 110 during operation. The flex assembly 130 can include a printed circuit board 132 to which head wires (not shown) are connected. The head wires may be routed along the actuator arms 114 and the flexures 116 to the heads 118. The printed circuit board 132 may include circuitry for controlling the write currents applied to the heads 118 during a write operation and a preamplifier (not shown) for amplifying read signals generated by the heads 118 during a read operation. The flex assembly 130 terminates at a flex bracket 134 for communication through the base 102 to a disc drive printed circuit board (not shown) mounted to the disc drive 100.

As shown in FIG. 1, a plurality of nominally circular, concentric tracks 109 are located on the surface of the discs 108. Each track 109 includes a number of servo fields that are interspersed with user data fields along the track 109. The user data fields are used to store user data, and the servo fields are used to store servo information used by a disc drive servo system to control the position of the heads 118.

Figure 2:
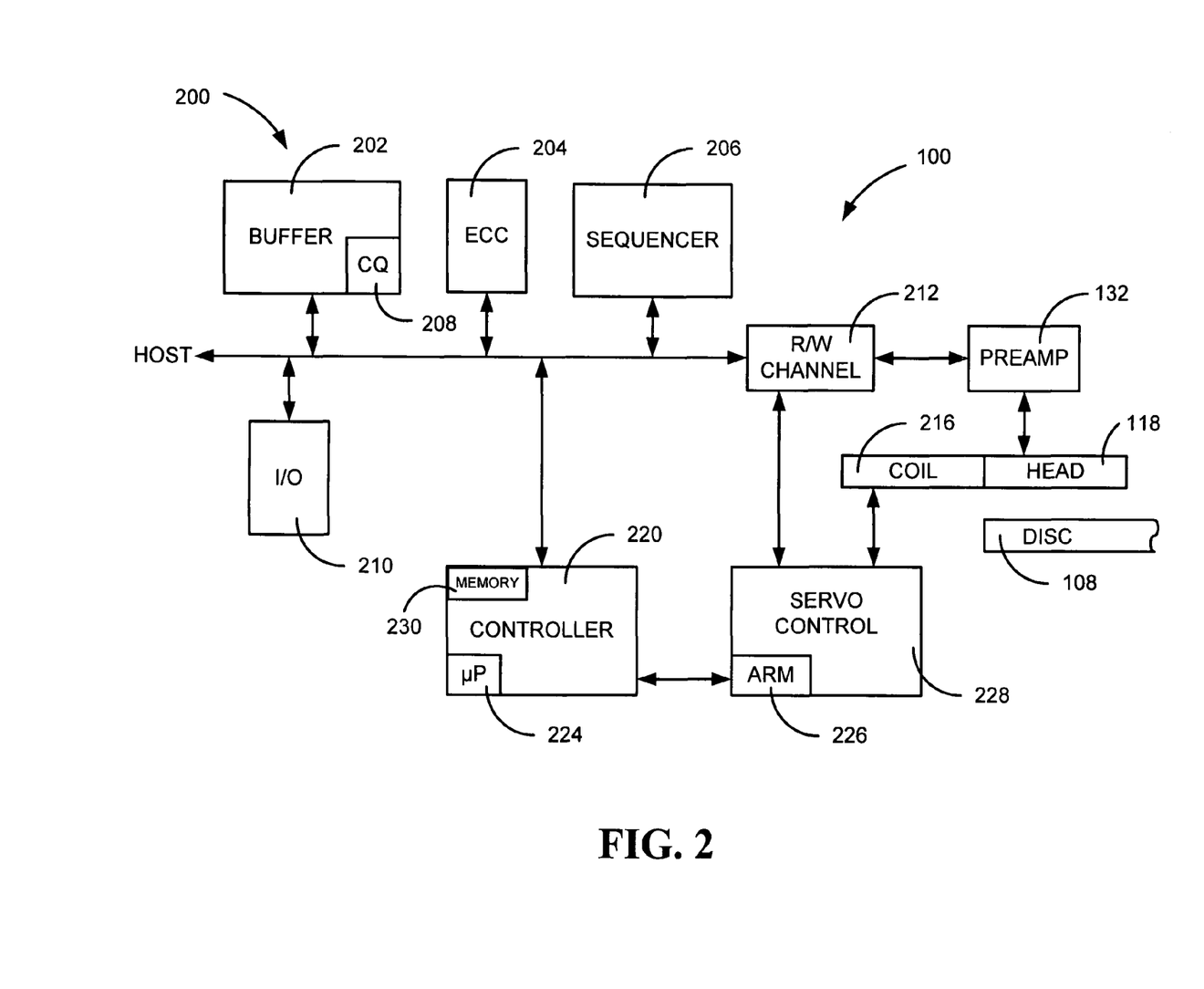
FIG. 2 is a block diagram of an illustrative embodiment of a disc drive system.

FIG. 2 provides a functional block diagram of the disc drive 100. A hardware/firmware based interface circuit 200 communicates with a host device (such as a personal computer, not shown) and directs overall disc drive operation. The interface circuit 200 includes a programmable controller 220 with associated memory 224, a buffer 202, an error correction code (ECC) block 204, a sequencer 206, and an input/output (I/O) control block 210.

The buffer 202 temporarily stores user data during read and write operations, and includes a command queue (CQ) 208 where multiple pending access operations are temporarily stored pending execution. The ECC block 204 applies on-the-fly error detection and correction to retrieved data. The sequencer 206 asserts read and write gates to direct the reading and writing of data. The I/O block 210 serves as an interface with the host device.

FIG. 2 further shows the disc drive 100 to include a read/write (R/W) channel 212 which encodes data during write operations and reconstructs user data retrieved from the discs 108 during read operations. A preamplifier/driver circuit (preamp) 132 applies write currents to the heads 118 and provides pre-amplification of readback signals.

A servo control circuit 228 uses servo data to provide the appropriate current to the coil 216 to position the heads 118. The controller 220 communicates with a processor 226 to move the heads 118 to the desired locations on the disc 108 during execution of the various pending commands in the command queue 208.

Figure 3:
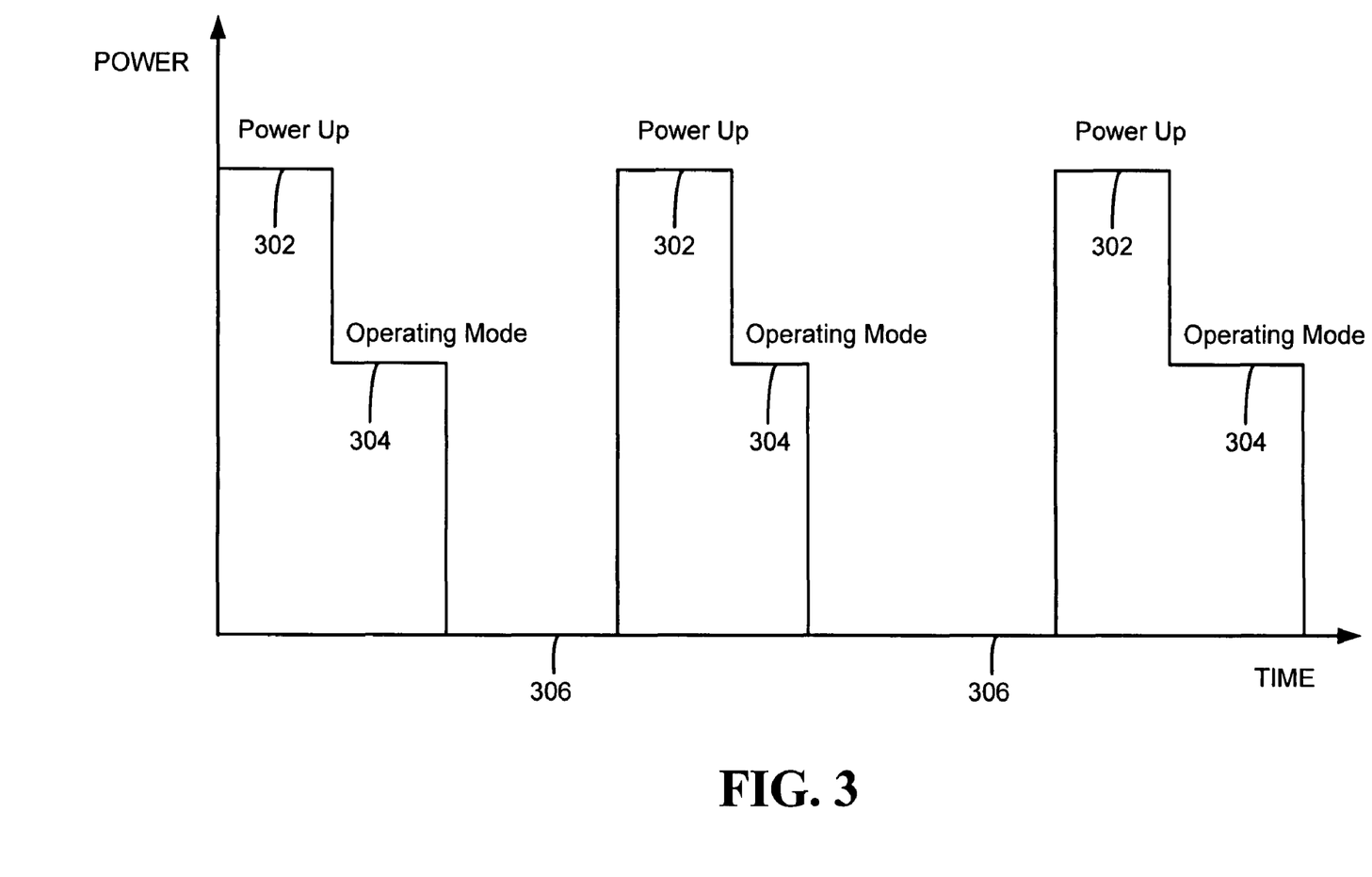
FIG. 3 is a timing diagram of an illustrative embodiment of a first power management operating sequence for an electronic device.

Referring to FIG. 3, a timing diagram of an illustrative embodiment of a first power management operating sequence for an electronic device is shown. In a particular embodiment, the first power management operating sequence shown in FIG. 3 is implemented in a data storage device, such as the disc drive 100. In another particular embodiment, the first power management operating sequence shown in FIG. 3 is implemented in one or more software programs running on a host, such as a host personal computer or a mobile device host.

In FIG. 3, a power up mode 302 is shown. In a particular embodiment, the power up mode 302 can occur when a device is powered on or is reset. An operating mode 304 occurs during operation of the electronic device. A power savings mode 306 is provided to allow the electronic device to save power. In a particular embodiment, as show in FIG. 3, the power savings mode 306 consists of turning the electronic device off such that there is minimal power consumption.

Various factors can determine when the electronic device should enter the power savings mode 306. In one embodiment, the power savings mode 306 is entered after a time period of non-activity has expired. In another embodiment, the power savings mode 306 is entered after the electronic device receives a command.

In addition, various factors can determine when the electronic device should exit the power savings mode 306. In one embodiment, the power savings mode 306 is exited after the electronic device receives a command or a request for operation. In another embodiment, the power savings mode 306 is exited after a predetermined time period.

In a particular embodiment, the disc drive 100 enters the power up mode 302 when the disc drive 100 is powered on. The power up mode 302 can consist of powering on the electronic components of the disc drive 100 and applying power to the spindle motor 106. After the power up mode 302, the disc drive 100 enters an operating mode 304 during which the disc drive 100 can receive read or write commands to store or retrieve data from the one or more discs 108. After the disc drive 100 has not received a command for a certain time period, the disc drive 100 enters power saving mode 306. During the power saving mode 306, the disc drive 100 can turn off the spindle motor and any unnecessary drive electronics. The disc drive 100 exits the power saving mode 306 when a new command is received by the disc drive 100. Once the disc drive 100 has exited the power saving mode 306, the disc drive 100 re-enters the power up mode 302 and then proceeds to the operating mode 304.

Figure 4:
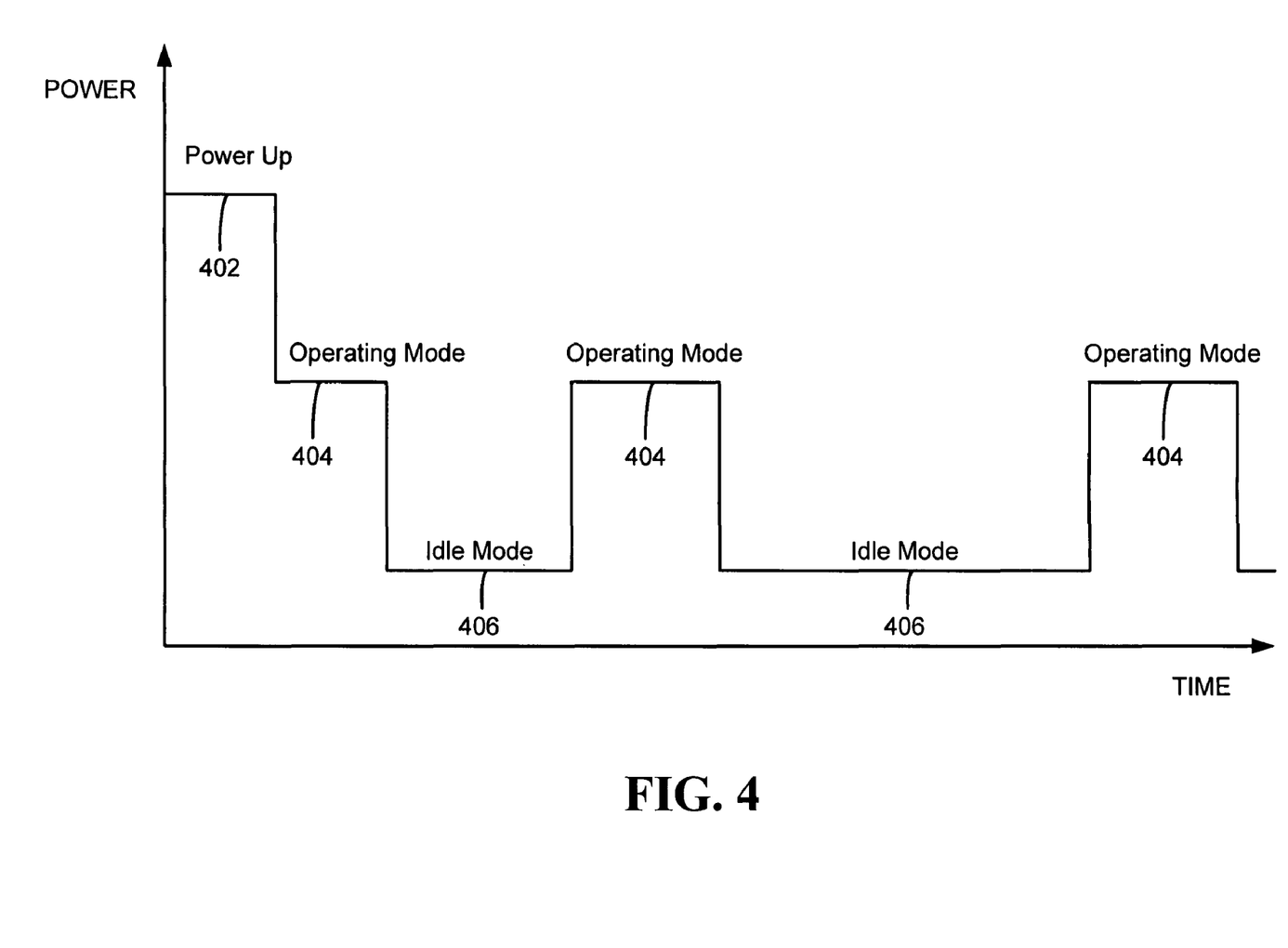
FIG. 4 is a timing diagram of an illustrative embodiment of a second power management operating sequence for an electronic device.

Referring to FIG. 4, a timing diagram of an illustrative embodiment of a second power management operating-sequence for an electronic device is shown. In a particular embodiment, the second power management operating sequence shown in FIG. 4 is implemented in a data storage device, such as the disc drive 100. In another particular embodiment, the second power management operating sequence shown in FIG. 4 is implemented in one or more software programs running on a host, such as a host personal computer or a mobile device host.

In FIG. 4, a power level of a power up mode 402 is shown. In a particular embodiment, the power up mode 402 can occur when a device is powered on or reset. An operating mode 404 occurs during operation of the electronic device. A power savings mode 406 is provided to allow the electronic device to save power. In a particular embodiment, as shown in FIG. 4, the power savings mode 406 consists of entering an idle mode to conserve power. The power savings mode 406 may also be referred to as an idle mode. In one embodiment, the power savings mode 406 turns off part of the electronic device while leaving another part of the device powered on. In a particular embodiment, during the power savings mode 406, the disc drive 100 turns off spindle motor 106 while leaving at least some electronic components powered on.

In a particular embodiment, a particular power management operating sequence may not have all the phases of operation or the same phases of operation of another power management operating sequence. For example, the second power management operating sequence, as shown in FIG. 4, does not have a reoccurring power-on phase after the initial power-on. Also, for example, the first power management operating sequence, as shown in FIG. 3, does not have a low power idle phase.

In additional embodiments, the disc drive 100 may adjust other factors that can effect the power consumption level of the disc drive 100 such as adjusting the clock speed for a processor, a memory interface bus, or an external interface bus. Also, the disc drive 100 may reduce power consumption by changing the rotation speed of the spindle motor 106. Further, the disc drive 100 may reduce power consumption by modifying the movement of the actuator 114. In addition, data caching parameters can be adjusted to reduce power consumption of the disc drive 100.

Various factors can determine when the electronic device should enter the power savings mode 406. In one embodiment, the power savings mode 406 is entered after a time period of non-activity has expired. In another embodiment, the power savings mode 406 is entered after the electronic device receives a command.

In addition, various factors can determine when the electronic device should exit the power savings mode 406. In one embodiment, the power savings mode 406 is exited after the electronic device receives a command or request for operation. In another embodiment, the power savings mode 406 is exited after a predetermined time period.

Figure 5:
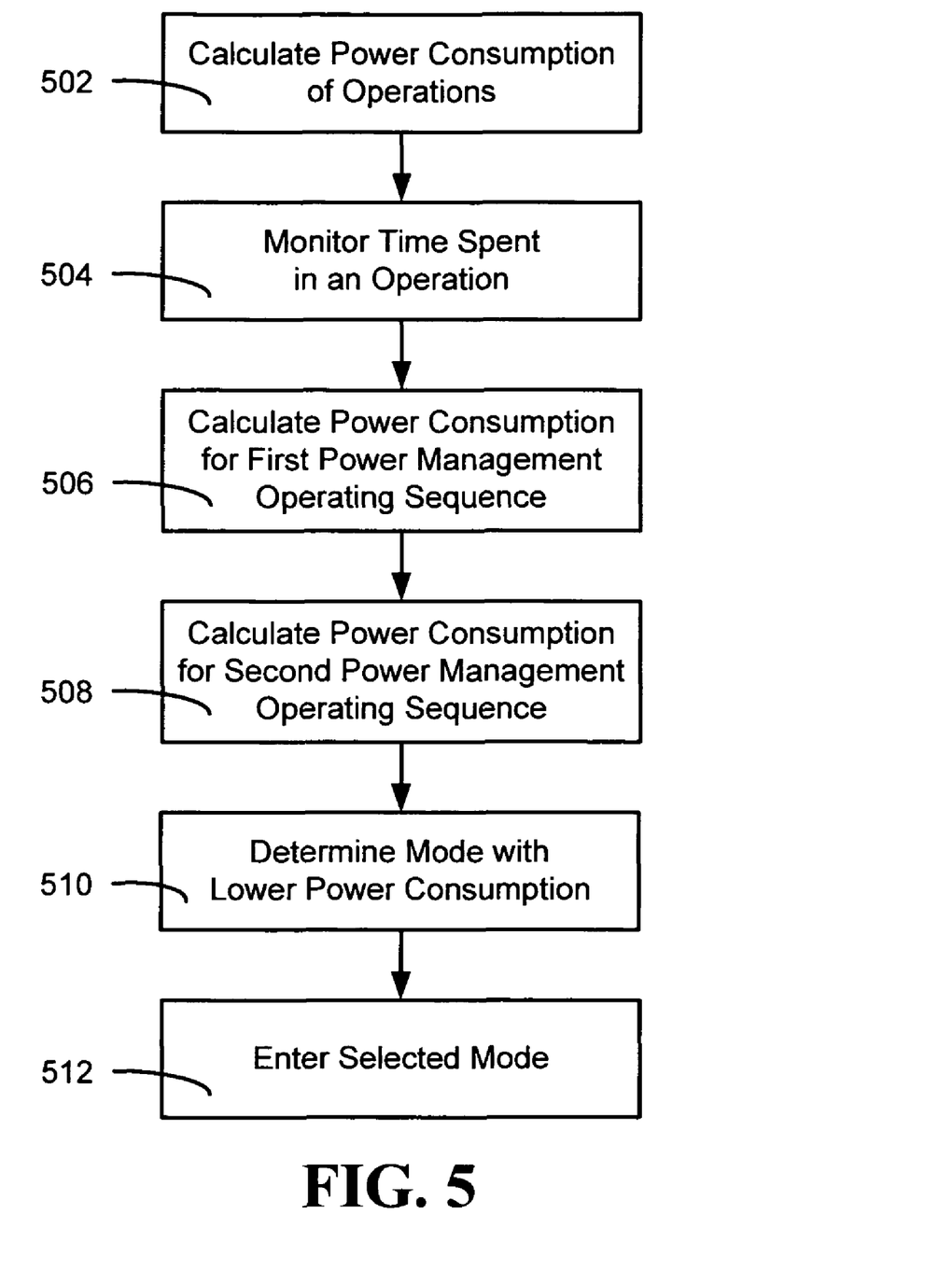
FIG. 5 is a flow diagram of an illustrative embodiment of a method for power management.

Referring to FIG. 5, a flow diagram of an illustrative embodiment of a method for power management is shown. Power consumption of certain operations of an electronic device are calculated, at 502. For example, in a particular embodiment, a power consumption value is calculated for each of the following phases of operation in a disc drive 100: spin up, spin down, read, write, seek, active idle, low power idle, and standby. Alternatively, a power consumption value can be calculated for one or more phases of operation, at 502. The power consumption calculations, at 502, can be performed during manufacture or while an electronic device is in use. Such calculations may differ per model of electronic device based on the electrical characteristics of the device. In a particular embodiment, one model of the disc drive 100 may have different power consumption values than another model of the disc drive 100.

In one particular embodiment, a spin up phase of operation occurs when a device is powered on to a nominal operating level; in another particular embodiment, the spin up phase of operation occurs when a spindle motor is powered on and brought to a nominal rotational velocity or speed. In another embodiment, a spin down phase of operation occurs when the power to a device is turned off; in one particular embodiment, the spin down phase of operation occurs when a spindle motor is powered down. In yet another particular embodiment, an active idle phase of operation occurs when a device is powered and functional but is not currently active. In another particular embodiment, a low power idle phase of operation occurs when a device is in a low power mode that has an idle, such as the power savings mode 406 shown in FIG. 4. In another embodiment, a standby phase of operation occurs when a device has entered a power savings mode, such as the power savings mode 306 shown in FIG. 3, where most of the power consuming elements have been powered off.

The amount of time spent in each phase of operation of the electronic device is monitored, at 504. In one embodiment, the time spent in each phase of operation is monitored for each of the phases of operation that had a power consumption value calculated, at 502. In a particular embodiment, the time spent in each phase of operation may be expressed by a percentage of time spent in each phase. Alternately, a measured amount of time may be determined for each phase of operation. In another particular embodiment, an amount of time is monitored for each of the following phases of operation in a disc drive 100: spin up, spin down, read, write, seek, active idle, low power idle, and standby. Alternatively, a device could implement the method of FIG. 5 by monitoring more or less phases of operation.

Using the calculations of the power consumption values, at 502, and the time spent in a phase of operation, at 504, a power consumption value for a first power management operating sequence is calculated, at 506. In a particular embodiment, the power consumption for the first power management operating sequence shown in FIG. 3 is calculated. The power consumption of the first power management operating sequence can be calculated using the calculations of the power consumption values, at 502, and the time spent in a phase of operation, at 504, to determine the amount of power used over a time period to execute the power up mode 302, the operating mode 304, and the power savings mode 306. In a particular embodiment, the time period is a time period based on an estimated arrival time of a command. In another particular embodiment, the time period is from the start of a power savings mode, such as mode 306, to a beginning of a next operating mode, such as mode 304.

Using the calculations of the power consumption values, at 502, and the time spent in a phase of operation, at 504, a power consumption value for a second power management operating sequence is calculated, at 508. In a particular embodiment, the power consumption for the second power management operating sequence shown in FIG. 4 is calculated. The power consumption of the second power management operating sequence can be calculated using the calculations of the power consumption values, at 502, and the time spent in a phase of operation, at 504, to determine the amount of power used over a time period to execute the operating mode 404, and the power savings mode 406. In a particular embodiment, the time period is a time period based on an estimated arrival time of a command. In another particular embodiment, the time period is from the start of a power savings mode, such as mode 406, to a beginning of a next operating mode, such as mode 404.

In a particular embodiment, the power consumption value for at least one of the power management operating sequences is based on previous activity of the device. In another particular embodiment, the power consumption value for the first power management operating sequence and the power consumption value for the second power management operating sequence are based on previous activity of the device.

For example, in a particular embodiment, the disc drive 100 has a first power management operating sequence, such as shown in FIG. 3, that has a first power savings mode 306. In addition, the disc drive 100 also has a second power management operating sequence, such as in FIG. 4, that has a second power savings mode 406. Prior to entering a specific power savings mode, a calculation is made to predict the power consumption over a specified time period for the first power management operating sequence by determining the amount of power necessary to execute the power up mode 302, the operating mode 304, and the power savings mode 306. In a further embodiment, the specified time period is based on an estimated arrival time of a command. In a further particular embodiment, the power savings mode 306 consists of the disc drive 100 removing all power to the spindle motor 106. In addition, prior to entering a specific power savings mode, a calculation is made to predict the power consumption over the specified time period for the second power management operating sequence by determining the amount of power necessary to execute the operating mode 404 and the power savings mode 406. In a particular embodiment, the power savings mode 406 consists of the disc drive 100 reducing power to the spindle motor 106. In a further particular embodiment, the power savings mode 406 consists of the disc drive 100 removing all power to the spindle motor 106 while still powering at least a part of the disc drive electronics.

The power consumption value of the first power management operating sequence is compared to the power consumption value of the second power management operating sequence and the mode with the lower power consumption value is selected, at 510. That is, the comparison allows a device to choose the power management operating sequence that is estimated to provide the greatest amount of power savings over a specified time period. In another particular embodiment, the time period is from the start of a power savings mode, such as mode 306 or 406, to a beginning of a next operating mode, such as mode 304 or 404.

In another embodiment, more than two power management operating sequences may be included. For example, in a particular embodiment, the disc drive 100 may have a first power management operating sequence that shuts the disc drive 100 completely off, a second power management operating sequence that removes power from only the spindle motor 106, and a third power management operating sequence that reduces the rotational speed of the spindle motor 106. In another particular embodiment, the disc drive 100 has a fourth power management operating sequence that removes power from the spindle motor 106 and removes power from at least a portion of the disc drive's 106 electronics.

In a particular embodiment, the calculations for the power consumption values of different power management operating sequences, such as the power consumption in the first power management operating sequence 506 and the power consumption in the second power management operating sequence 508, and the selection of the lowest power consumption of the power management operating sequences, such as 510, can be accomplished by use of a single function. In one embodiment, for a data storage device, such as disc drive 100, the lower power consumption value can be determined by:

$$\min(P1stSEQ, P2ndSEQ)$$

where:

$$P1stSEQ=Psu*su1+Psd*sd1+Pr*r1+Pw*w1+Ps*s1+Pa*a1+P1*L1+Psb*sb1;$$

$$P2ndSEQ=Psu*su2+Psd*sd2+Pr*r2+Pw*w2+Ps*s2+Pa*a2+P1*L2+Psb*sb2;$$

where:
Psu=power consumption of spin up phase of operation;
Psd=power consumption of spin down phase of operation;
Pr=power consumption of read phase of operation;
Pw=power consumption of write phase of operation;
Ps=power consumption of seek phase of operation;
Pa=power consumption of active idle phase of operation;
P1=power consumption of low power idle phase of operation;
Psb=power consumption of standby phase of operation;
Su1=percentage of time spent in spin up phase of a first sequence;
Sd1=percentage of time spent in spin down phase of a first sequence;
r1=percentage of time spent in read phase of a first sequence;
w1=percentage of time spent in write phase of a first sequence;
s1=percentage of time spent in seek phase of a first sequence;
a1=percentage of time spent in active idle phase of a first sequence;
L1=percentage of time spent in low power idle phase of a first sequence;
sb1=percentage of time spent in standby phase of a first sequence;
su2=percentage of time spent in spin up phase of a second sequence;
sd2=percentage of time spent in spin down phase of a second sequence;
r2=percentage of time spent in read phase of a second sequence;
w2=percentage of time spent in write phase of a second sequence;
s2=percentage of time spent in seek phase of a second sequence;
a2=percentage of time spent in active idle phase of a second sequence;
L2=percentage of time spent in low power idle phase of a second sequence;
sb2=percentage of time spent in standby phase of a second sequence;

where the min( ) function returns the smaller of two values. P1stSEQ is a power consumption value for the first power management operating sequence and P2ndSEQ is a power consumption value for the second power management operating sequence. By returning the smaller of two power consumption values, the power management operating sequence that has a lower power consumption over a specified period of time can be chosen; thus, allowing a device to save a larger amount of energy over the specified time period than the other power management operating sequences. In another particular embodiment, the time period is from the start of a power savings mode, such as mode 306 or 406, to a beginning of a next operating mode, such as mode 304 or 404.

In a particular embodiment, a selection of the lowest power consumption value of three or more power management operating sequences may be determined by implementing the min( ) function more than once. For example, the lower of two power consumption values can be determined by:

$$1stResult=\min(P1stSEQ, P2ndSEQ).$$

Then, the lower of the first result (1stResult) and a third power management operating sequence can be determined by:

$$2ndResult=\min(1stResult, P3rdSEQ);$$

where the P3rdSEQ is a power consumption value for the third power management operating sequence. By returning the smaller of two power consumption values as the 2ndResult, the power management operating sequence that has a lowest power consumption value over a specified period of time can be chosen. This step can be repeated until all of the power consumption values for each power management operating sequence has been compared to the previous result.

In a particular embodiment, a particular power management operating sequence may not have all the phases of operation or the same phases of operation of another power management operating sequence. For example, the first power management operating sequence, as shown in FIG. 3, does not have a low power idle phase, thus L1 is 0% for the first power management operating sequence. Also, for example, the second power management operating sequence, as shown in FIG. 4, does not have a reoccurring power-on phase after the initial power-on, thus su2 is 0% for the second power management operating sequence.

In a particular embodiment, the method of FIG. 5 can be entirely implemented within an electronic device, such as a personal computer or a mobile computing device. In another particular embodiment, the method of FIG. 5 can be entirely implemented within a data storage device, such as the disc drive 100. All or a subset of the method shown in FIG. 5 may be performed dynamically, that is, the method may be performed prior to or each time the device enters a power savings mode, such as power saving mode 306 or 406. In a particular embodiment, the disc drive 100 can perform the method of FIG. 5 while in operating modes 304 or 404. For example, by selecting the power management operating sequence with the lower power consumption, the disc drive 100 can dynamically select which power management operating sequence to further execute, thus choosing whether to enter the power savings mode 306 of the first power management operating sequence or the power savings mode 406 of the second power management operating sequence.

Figure 6:
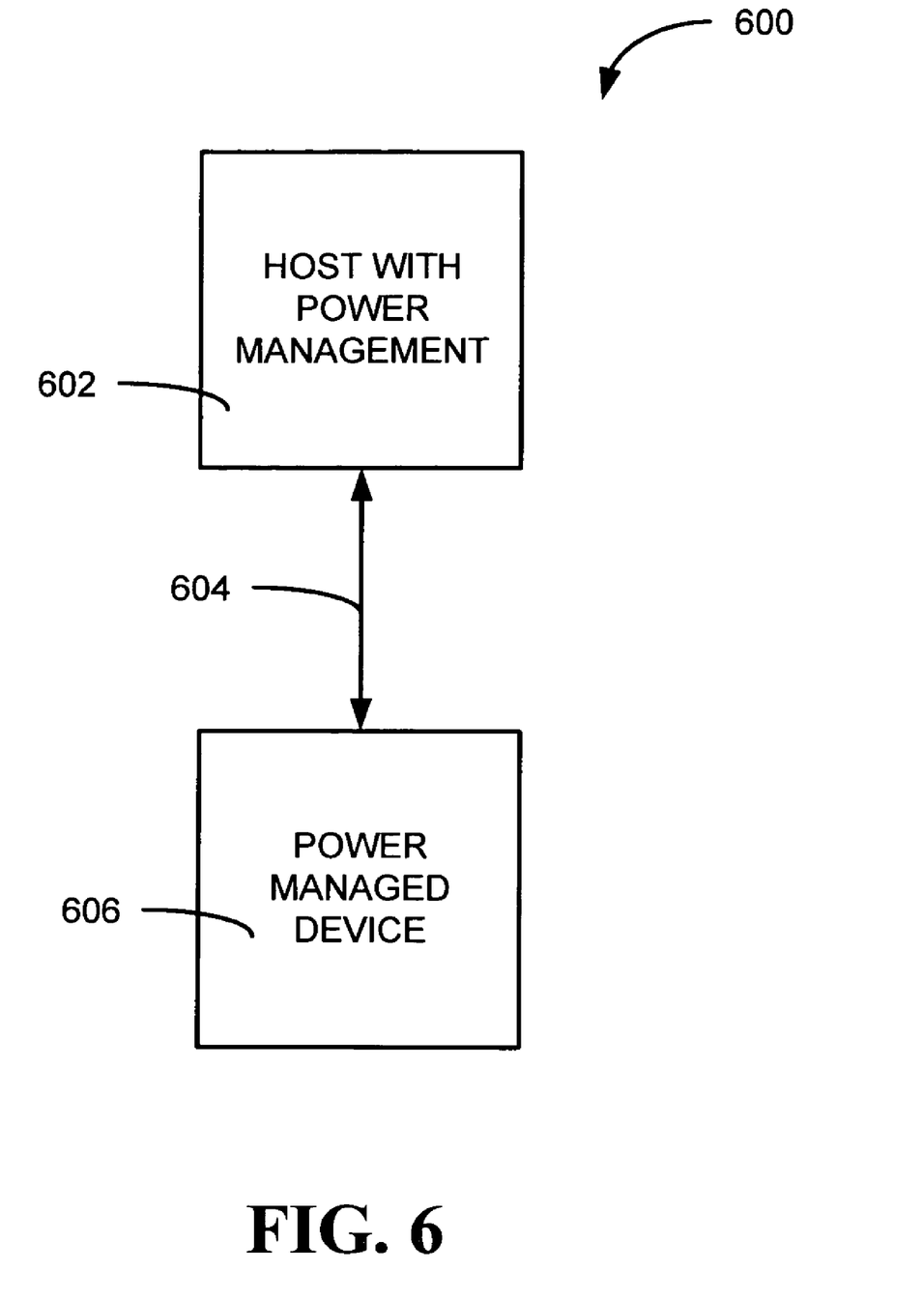
FIG. 6 is a block diagram of an illustrative embodiment of a device that may utilize a method for power management, such as that described with respect to FIG. 5.

Referring to FIG. 6, a computing device 600 is shown. In a particular embodiment, the computing device 600 is a mobile or portable device, such as a personal digital assistant (PDA), a cell phone, a music player, or a laptop computer. In another particular embodiment, the computing device 600 is a personal computer (PC).

As shown in FIG. 6, the computing device 600 includes a host 602. In a particular embodiment, the host 602 is a PC host. In another particular embodiment, the host 602 is a mobile device host computer. In yet another particular embodiment, the host 602 includes a processor (not shown), a memory (not shown), and a communication interface (not shown). The host 602 can be any type of device, such as a processor or controller, that is operable to execute a method of power management or is operable to execute instructions related to a method of power management, such as the method shown in FIG. 5. In a particular embodiment, at least a portion of the method shown in FIG. 5 is implemented by one or more software programs executable by the host 602.

Also shown in FIG. 6, the computing device 600 includes a power managed device 606. In a particular embodiment, the power managed device 606 is a data storage device. In another particular embodiment, the power managed device 606 is a disc drive, such as disc drive 100. The power managed device 606 can be any device capable of having different power consumption levels manageable by the host 602.

A communication interface 604 allows commands and data to be sent between the host 602 and the power managed device 606. In a particular embodiment, the communication interface 604 is an Intelligent Drive Electronics (IDE) interface. An IDE interface may also be referred to as Advanced Technology Attachment (ATA) interface. In another particular embodiment, the communication interface 604 is any interface that allows for two-way communication between a host and a device. For example, communication interface 604 may be a Serial ATA (SATA) interface, a Small Computer System Interface (SCSI), a Serial Attached SCSI (SAS), a Fibre Channel-Arbitrated Loop (FC-AL) interface, or a Compact Flash (CF) interface.

In a particular embodiment, the host 602 is operable to execute a power management method, such as shown in FIG. 5, to dynamically select one of multiple power management operating sequences for the power managed device 606 to execute. In a particular embodiment, the host 602 dynamically determines the power management operating sequence the power managed device 606 should execute while the power managed device 606 is in an operating mode, such as operating mode 304 or 404. In another particular embodiment, the host 602 dynamically determines the power management operating sequence the power managed device 606 should execute while the power managed device 606 is in a power savings mode, such as power savings mode 306 or 406. After the host 602 selects one of the multiple power manage-ment operating sequences, the host 602 communicates the selected power management operating sequence to the power managed device 606 via the communication interface 604.

In a particular embodiment, host 602 is a mobile device host, communication interface 604 is an IDE interface, and power managed device 606 is a disc drive, such as disc drive 100. In another particular embodiment, the method shown in FIG. 5 is implemented in one or more software programs running on the host 602.

In accordance with various embodiments, the methods and power management operating sequences described herein may be implemented as one or more software programs running on a computer processor or controller, such as the controller 220. In accordance with another embodiment, the methods and power management operating sequence described herein may be implemented as one or more software programs running on a host device, such as a PC that is using a disc drive. Dedicated hardware implementations including, but not limited to, application specific integrated circuits, programmable logic arrays and other hardware devices can likewise be constructed to implement the methods described herein.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A controller operable to select one of a first power management operating sequence and a second power management operating sequence at least partially based on which power management operating sequence is determined to provide a larger amount of power savings over a time period, wherein the power management operating sequences respectively reduce power to different components of the electronic device.

2. The controller of claim 1, wherein the controller is within a device comprising the first power management operating sequence and the second power management operating sequence, wherein the second power management operating sequence reduces power to a first component and a second component.

3. The controller of claim 2, wherein the first power management operating sequence comprises at least a first power savings mode that reduces power to the first component and a first operating mode; and wherein the second power management operating sequence comprises at least a second power savings mode that reduces power to the second component, a power up mode, and a second operating mode.

4. The controller of claim 2, wherein the controller is further adapted to determine which power management operating sequence to select based on a time period from the start of a power savings mode to a beginning of a next operating mode.

5. The controller of claim 3, further comprising:
a motor operably coupled to the controller.

6. The controller of claim 5, wherein the first power savings mode removes power from at least the motor; and wherein the second power savings mode removes power from at least the motor, an electronic circuit, and the controller.

7. The controller of claim 6, further comprising:
a data storage medium rotatably attached to the motor;
a transducer for reading and writing data to the data storage medium;
wherein the electronic circuit is coupled to the transducer.

8. The controller of claim 7, further comprising operating modes of a spin up phase, a spin down phase, an active idle phase, a low power phase, and a standby phase.

9. The controller of claim 1, wherein the controller is further programmed to select a power management operating sequence from more than two available power management operating sequences.

10. The controller of claim 1, wherein the selection of either the first power management operating sequence or the second power management operating sequence is dynamically determined.

11. The controller of claim 1, wherein the selection of either the first power management operating sequence or the second power management operating sequence is at least partially determined by an amount of time the device has spent in a first phase of operation and an amount of time the device has spent in a second phase of operation.

12. The controller of claim 1, wherein the first power management operating sequence reduces power to a first number of components of the electronic device and wherein the second power management operating sequence reduces power to a second number of components of the electronic device, where the first number and the second number are different.

13. A tangible computer-readable medium storing instructions, that when executed by a processor, cause the processor to perform a method comprising:
determining a first power consumption value for a first power management operating sequence of an electronic device, the first power management operating sequence reducing power to a first component of the electronic device;
determining a second power consumption value for a second power management operating sequence, the second power management operating sequence reducing power to the first component and a second component of the electronic device; and
dynamically selecting either the first power management operating sequence or the second power management operating sequence based on which power management operating sequence is determined to provide a larger amount of power savings over a time period.

14. The computer-readable medium of claim 13, wherein the method further comprises:
selecting the first power management operating sequence when the first power consumption value is less than the second power consumption value.

15. The computer-readable medium of claim 14, wherein the method further comprises:
selecting the second power management operating sequence when the second power consumption value is less than the first power consumption value.

16. The computer-readable medium of claim 13, wherein the method further comprises determining at least the second power consumption value at least partially by an amount of time the electronic device has spent in more than one phase of operation.

17. The computer-readable medium of claim 13, wherein the method further comprises determining the second power consumption value at least partially by an amount of time the electronic device has spent in a phase of operation.

18. A device, comprising:
an electronic circuit operable at a nominal power level;
a first power management operating sequence for reducing power usage of the electronic circuit below the nominal power level, the first power management operating sequence reduces power to a first component of the electronic circuit;
a second power management operating sequence for reducing power usage of the electronic circuit below the nominal power level, the second power management operating sequence different than the first power management operating sequence, the second power management operating sequence reduces power to the first component and a second component of the electronic circuit; and
a controller coupled to the electronic circuit and operable to selectively implement the first power management operating sequence and the second power management operating sequence.

19. The device of claim 18, further comprising:
a host;
an interface communicatively coupled to the host and the controller; and
wherein the host is operable to execute instructions to select either the first power management operating sequence or the second power management operating sequence based on an amount of time the electronic device has spent in a phase of operation and send an instruction over the interface to the controller to selectively implement the first power management operating sequence and the second power management operating sequence.

20. The device of claim 19, wherein the device is a personal data assistant, a portable music player, a cell phone, or a laptop computer.

21. The device of claim 20, wherein the electronic circuit is a data storage device.

22. A controller configured to include a first power management operating sequence to reduce power to a first component of an electronic device, a second power management operating sequence to reduce power to a second component of the electronic device, and to selectively implement a power management operating sequence at least partially based on which power management operating sequence is determined to provide a larger amount of power savings over a time period.

23. The controller of claim 22, further comprising the first power management operating sequence reduces power to a first number of components of the electronic device and the second power management operating sequence reduces power to a second number of components of the electronic device, where the first number and the second number are different.

24. The controller of claim 23, further comprising the first power management operating sequence reduces power to a first component of the electronic device and the second power management operating sequence reduces power to the first component and a second component of the electronic device.

25. The controller of claim 24, further comprising:
the first power management operating sequence has:
  a first power savings mode that reduces power to the first component;
  a first operating mode to operate at least part of the electronic device during the first power savings mode;
the second power management operating sequence has:
  a second power savings mode that reduces power to the first component and the second component;
  a power mode to increase power to at least one component; and
  a second operating mode to operate at least part of the electronic device during the second power savings mode.

* * * * *